United States Patent
Matsubara et al.

(10) Patent No.: US 7,976,428 B2
(45) Date of Patent: Jul. 12, 2011

(54) CONTROL SYSTEM FOR DRIVE UNIT OF VEHICLE

(75) Inventors: Tooru Matsubara, Toyota (JP); Takashi Ohta, Toyota (JP); Hideaki Komada, Gotenba (JP); Yukihiko Ideshio, Susono (JP); Hiroyuki Shibata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 625 days.

(21) Appl. No.: 12/090,518

(22) PCT Filed: Oct. 26, 2006

(86) PCT No.: PCT/JP2006/321346
§ 371 (c)(1),
(2), (4) Date: Apr. 17, 2008

(87) PCT Pub. No.: WO2007/049682
PCT Pub. Date: May 3, 2007

(65) Prior Publication Data
US 2009/0291801 A1    Nov. 26, 2009

(30) Foreign Application Priority Data

Oct. 26, 2005    (JP) ................... 2005-312062

(51) Int. Cl.
*B60W 10/06*    (2006.01)
*B60W 10/10*    (2006.01)

(52) U.S. Cl. .................... 477/15; 477/5; 477/6; 477/20

(58) Field of Classification Search .................. 477/2, 5, 477/6, 15, 20
See application file for complete search history.

(56) References Cited

U.S. PATENT DOCUMENTS

| 7,540,826 B2 * | 6/2009 | Ochiai .................... 477/211 |
| 7,727,112 B2 * | 6/2010 | Kakinami et al. .............. 477/79 |
| 7,798,938 B2 * | 9/2010 | Matsubara et al. ............... 477/3 |
| 2006/0166784 A1 | 7/2006 | Tabata et al. |
| 2009/0229393 A1 * | 9/2009 | Shibata et al. .................. 74/335 |

FOREIGN PATENT DOCUMENTS

| JP | 2000 2327 | 1/2000 |
| JP | 2003 127681 | 5/2003 |
| JP | 2005 61498 | 3/2005 |
| JP | 2005 256883 | 9/2005 |

* cited by examiner

*Primary Examiner* — Ha D. Ho
(74) *Attorney, Agent, or Firm* — Oblon, Spivak, McClelland, Maier & Neustadt, L.L.P.

(57) ABSTRACT

A control system for a drive unit of a vehicle, in which a power distribution mechanism is arranged on a route from a prime mover to a wheel, and a transmission is arranged on an output side of the power distribution mechanism. The control system includes a revolution frequency controller that restrains a variation in a revolution frequency of the prime mover by controlling a revolution frequency of the reaction force establishing device until a predetermined time elapses since a commencement of a shifting operation of the transmission. The control system is capable of restraining a variation in an output torque, in case of carrying out a shifting operation of a transmission arranged on an output side of a prime mover.

24 Claims, 9 Drawing Sheets

|     | C1 | C2 | B1 | B2 |
|-----|----|----|----|----|
| 1st | ○  |    |    | ○  |
| 2nd | ○  |    | ○  |    |
| 3rd | ○  | ○  |    |    |
| 4th | ○  | ○  |    |    |
| R   |    | ○  |    | ○  |
| N   |    |    |    |    | a reaction element connected with a reaction force establishing device and an output element connected with an input side of the transmission, and a speed change ratio of the power distribution mechanism can be controlled by controlling an output of the reaction force establishing device establishing a reaction force against the prime mover, characterized by comprising: a revolution frequency control means for restraining a variation in a revolution frequency of the prime mover by controlling a revolution frequency of the reaction force establishing device until a predetermined time elapses after a commencement of a shifting operation of the transmission.

CONTROL SYSTEM FOR DRIVE UNIT OF VEHICLE

TECHNICAL FIELD

This invention relates to a control system for a drive unit of a vehicle, in which a transmission is arranged on a route from a prime mover to a wheel.

BACKGROUND ART

In recent years, a hybrid vehicle comprising an engine and a motor generator has been proposed for the purpose of saving a fuel for driving the engine, reducing noise resulting from a rotation of the engine, and reducing emission resulting from combustion of the fuel. In the hybrid vehicle, the engine and the motor are controlled on the basis of a running condition of the vehicle when the vehicle is running.

Specifically, the hybrid vehicle can be run by driving the engine in a revolution region where combustion efficiency thereof is preferable, and also by using the motor generator as a motor while halting the engine in a revolution region where the combustion efficiency of the engine is degraded. One example of a control system for a drive system thus having an engine and a motor generator is disclosed in Japanese Patent Laid-Open No. 2003-127681. According to the system disclosed in Japanese Patent Laid-Open No. 2003-127681, an output torque of an internal combustion engine is transmitted to a wheel via a planetary gear mechanism, a transmission, a propeller shaft, a differential device and a vehicle axle. The planetary gear mechanism comprises a sun gear, ring gear and a carrier, and a crankshaft of the engine is connected with the carrier. Also, a first motor/generator is provided and a rotor thereof is connected with the sun gear. The ring gear is connected with the transmission. On the other hand, a second motor/generator is provided and a rotor thereof is connected with the propeller shaft. Japanese Patent Laid-Open No. 2003-127681 describes that torque of the vehicle axle is generated by the internal combustion engine and the second motor/generator, and a transmission having a plurality of planetary gear mechanisms, a clutch and a brake is disclosed therein as an example of the transmission. A first gear position, a second gear position, a third gear position and a reverse position of the transmission are achieved by controlling an engagement and a releasing of the clutch and the brake.

However, according to the vehicle taught by Japanese Patent Laid-Open No. 2003-127681, driving force may be fluctuated by a change in the output torque of the transmission when carrying out a shifting operation. Therefore, the driver and passenger may feel uncomfortable feeling due to such fluctuation in the driving force.

DISCLOSURE OF THE INVENTION

The present invention has been conceived noting the technical problems thus far described, and its object is to provide a control system for a drive unit of a vehicle, which is capable of preventing a variation in an output torque of the transmission arranged on an output side of the prime mover, in case of carrying out a shifting operation of the transmission.

In order to achieve the above-mentioned object, according to the present invention, there is provided a control system for a drive unit of a vehicle, in which a power distribution mechanism is arranged on a route from a prime mover to a wheel, a transmission is arranged on an output side of the power distribution mechanism, the power distribution mechanism comprises an input element connected with the prime mover, According to another aspect of the invention, there is provided a control system for a drive unit of a vehicle, in which a power distribution mechanism is arranged on a route from a prime mover to a wheel, a transmission is arranged on an output side of the power distribution mechanism, the power distribution mechanism comprises an input element connected with the prime mover, a reaction element connected with a reaction force establishing device and an output element connected with an input side of the transmission, and a speed change ratio of the power distribution mechanism can be controlled by controlling an output of the reaction force establishing device establishing a reaction force against the prime mover, characterized in that: a control content for controlling a revolution frequency of the reaction force establishing device is changed in case of carrying out a shifting operation of the transmission, from the control content for controlling a revolution frequency of the reaction force establishing device of a case in which a shifting operation of the transmission is not carried out.

According to still another aspect of the invention, there is provided a control system for a drive unit of a vehicle, in which a power distribution mechanism is arranged on a route from a prime mover to a wheel, a transmission is arranged on an output side of the power distribution mechanism, the power distribution mechanism comprises an input element connected with the prime mover, a reaction element connected with a reaction force establishing device and an output element connected with an input side of the transmission, and a speed change ratio of the power distribution mechanism can be controlled by controlling an output of the reaction force establishing device establishing a reaction force against the prime mover, characterized in that: a variation in a revolution frequency of the reaction force establishing device resulting from an execution of a revolution control in case of carrying out a shifting operation of the transmission is restrained smaller than that of a case in which the shifting operation of the transmission is not carried out.

In addition to above, the drive unit of a vehicle to which the invention is applied comprises a second prime mover inputting a torque to an input side of the transmission.

According to the invention, the prime mover includes an engine, and the second prime mover includes an electric motor.

The above-mentioned revolution frequency control means includes a means for suppressing a rise in a revolution frequency of the prime mover by controlling a revolution frequency of the reaction force establishing device within a predetermined time from a commencement of a shifting operation, in case a demand to raise a driving force of the vehicle is outputted and a shifting operation to increase a speed change ratio of the transmission is carried out.

In addition to above, according to the invention, a driving mode can be switched selectively between a first driving mode where a torque of the engine is not transmitted to the wheel but a torque of the electric motor is transmitted to a wheel through the transmission, and a second driving mode where the torque of the engine is transmitted to the wheel. Also, the revolution frequency control means further includes a means for suppressing a rise in a revolution frequency of the engine by holding the revolution frequency of the reaction force establishing device at a point when a predetermined time has elapsed since a starting period of the engine started by switching the driving mode from the first driving mode to the second driving mode.

The control system of the invention further comprises a first electric motor control means for determining a target revolution and a target torque of the electric motor after a lapse of the predetermined time from a commencement of the shifting operation of the transmission, on the basis of a drive demand of the vehicle and a speed change ratio of the transmission before the shifting operation.

Also, the control system of the invention further comprises a second electric motor control means for controlling a torque of the electric motor after the torque of the electric motor is controlled by the first electric motor control means, according to a revolution frequency of the electric motor corresponding to a speed change ratio of the transmission after a shifting operation, before the revolution frequency of the electric motor reaches the revolution frequency corresponding to the speed change ratio of the transmission after the shifting operation.

Moreover, the revolution frequency control means includes a means for restraining a drop in a revolution frequency of the prime mover by controlling a revolution frequency of the reaction force establishing device within a predetermined time from a commencement of a shifting operation, in case a demand for reducing a driving force of the vehicle is being outputted and shifting operation to reduce a speed change ratio of the transmission is carried out.

The control system of the invention further comprises a first canceling means for canceling the control of restraining a drop in a revolution frequency of the prime mover, and controlling a revolution frequency of the reaction force establishing device to control a speed change ratio of the power distribution mechanism based on a drive demand of the vehicle, in case a demand for increasing the driving force of the vehicle is outputted within the predetermined time from the commencement of the shifting operation of the transmission.

The control system of the invention further comprises a drive demand judging means for judging a drive demand of the vehicle on the basis of a vehicle speed and an opening degree of an accelerator, and a second canceling means for determining a revolution frequency of the reaction force establishing device to control a speed change ratio of the power distribution mechanism based on the drive demand, and for canceling a restraining revolution frequency obtained and stored to restrain a drop in a revolution frequency of the prime mover, in case the determined revolution frequency of the reaction force establishing device is much more effective than the restraining revolution frequency to restrain a drop in a revolution frequency of the prime mover.

In addition to above, a gear stage of the transmission of the invention is controlled by engaging or releasing the clutch mechanism.

According to the invention, a shifting operation of the transmission includes both a downshifting to increase a speed change ratio thereof and an upshifting to reduce a speed change ratio thereof.

Meanwhile, according to the invention, the predetermined time includes a period from a satisfaction of a judgment of shifting operation of the transmission to a commencement of an inertia phase.

Also, the predetermined time includes a period from a start of the engine to a completion of a combustion of the engine.

The aforementioned power distribution mechanism includes an electrical continuously variable transmission in which a speed change ratio thereof is controlled electrically and varied continuously, and the transmission includes a geared transmission in which a gear stage thereof is changed stepwise. Those electrical continuously variable transmission and geared transmission may be connected in tandem so as to input power outputted from any one of those transmissions to the other one. Also, a total speed change ratio of the drive unit may be set by both of the electrical continuously variable transmission and geared transmission.

The electrical continuously variable transmission includes a single pinion type planetary gear mechanism comprising a carrier functioning as an input element, a sun gear functioning as a reaction element, and a ring gear functioning as an output element.

On the other hand, the transmission comprises two sets of planetary gear mechanisms and a plurality of engagement devices.

In addition to above, according to the invention, the two sets of planetary gear mechanisms include a single pinion type planetary gear mechanism. The sun gears of the first and the second planetary gear mechanisms are connected with each other, and the carrier of the first planetary gear mechanism and the ring gear of the second planetary gear mechanism are connected with each other. Also, the engagement device comprises: a first clutch connecting the ring gear of the first planetary gear mechanism with the output element of the power distribution mechanism selectively; a second clutch connecting the sun gear of the first planetary gear mechanism and the sun gear of the second planetary gear mechanism with the output element of the power distribution mechanism selectively; a first brake fixing the sun gears of the first and the second planetary gear mechanisms selectively; and a second brake fixing the carrier of the second planetary gear mechanisms selectively.

According to the invention, therefore, a driving force is generated by transmitting the torque of the prime mover to the wheel through the transmission. As mentioned above, the speed change ratio of the power distribution mechanism is controlled by controlling the revolution frequency of the reaction force establishing device. Also, the power of the prime mover can be prevented from being consumed in an inertia phase resulting from a change in a revolution frequency of the prime mover, by restraining a variation in the revolution frequency of the prime mover by controlling a revolution frequency of the reaction force establishing device within the predetermined time from a commencement of a shifting operation of the transmission. Consequently, a variation in the output torque of the transmission can be restrained.

The above explained advantage can also be achieved by changing the control content for controlling a revolution frequency of the reaction force establishing device in case of carrying out a shifting operation of the transmission, from the control content of a case in which a shifting operation of the transmission is not carried out.

Alternatively, the above explained advantage can also be achieved by restraining a variation in a revolution frequency of the reaction force establishing device resulting from an execution of a revolution control in case of carrying out a shifting operation of the transmission, to a variation smaller than the variation of a case in which the shifting operation of the transmission is not carried out.

In addition to the above advantage, according to the invention, the torque of the second prime mover can be transmitted to the wheel through the transmission.

The torques of the engine and the electric motor can also be transmitted to the wheel through the transmission.

According to the invention, a rise in the revolution frequency of the prime mover can be suppressed by controlling a revolution frequency of the reaction force establishing device within a predetermined time from a commencement of a shifting operation, in case a demand to raise a driving force of the vehicle is outputted and a shifting operation to increase a speed change ratio of the transmission is carried out. Therefore, a rise in the revolution frequency of the prime mover can be suppressed certainly in case a demand to raise a driving force of the vehicle is outputted when carrying out a shifting operation to increase a speed change ratio of the transmission.

In addition to the above advantages, according to the invention, in case the engine is started and a demand for transmitting an engine torque to the transmission is outputted when the torque of the engine is not being transmitted to the wheel but the torque of the electric motor is being transmitted to the wheel through the transmission, a rise in a revolution frequency of the prime mover can be suppressed by holding the revolution frequency of the reaction force establishing device at a point when a predetermined time has elapsed since the engine is started. Therefore, the power of the engine can be prevented certainly from being consumed in an inertia phase resulting from a rise in a revolution frequency of the engine.

In addition to the above advantages, after a lapse of the predetermined time, the target revolution frequency and the target torque of the electric motor are determined on the basis of a drive demand of the vehicle and a speed change ratio of the transmission before the shifting operation. Therefore, a drop in the output torque of the transmission can be restrained after a lapse of the predetermined time. For this reason, shocks resulting from a shifting operation can be prevented.

In addition to the above advantages, after the torque of the electric motor is controlled, the torque of the electric motor is controlled according to a revolution frequency thereof corresponding to a speed change ratio of the transmission after a shifting operation, before the revolution frequency thereof reaches the revolution corresponding to a speed change ratio of the transmission after the shifting operation.

In addition to the above advantages, according to the invention, a drop in a revolution frequency of the prime mover can be restrained within a predetermined time from the commencement of the shifting operation by controlling a revolution frequency of the reaction force establishing device, in case a demand for reducing a driving force of the vehicle is being outputted and a shifting operation to reduce a speed change ratio of the transmission is carried out. Therefore, a variation in the revolution frequency of the reaction force establishing device can be prevented from being widened during the predetermined time, e.g., during an inertia phase of a shifting operation of the transmission.

In addition to the above advantages, according to the invention, in case a demand for increasing the driving force of the vehicle is outputted within the predetermined time from the commencement of the shifting operation of the transmission, the control of restraining a drop in a revolution frequency of the prime mover is cancelled, and a revolution frequency of the reaction force establishing device is controlled to control a speed change ratio of the power distribution mechanism based on a drive demand of the vehicle. Therefore, the revolution frequencies of the reaction force establishing device and the prime mover can be controlled in accordance with a drive demand.

In addition to the above advantages, according to the invention, a drive demand of the vehicle is judged on the basis of a vehicle speed and an opening degree of the accelerator, and a revolution frequency of the reaction force establishing device is determined to control a speed change ratio of the power distribution mechanism based on the drive demand. In case the revolution frequency of the reaction force establishing device is much more effective to restrain a drop in a revolution frequency of the prime mover than the restraining revolution, the stored restraining revolution is cancelled. Therefore, a drop in a revolution frequency of the prime mover can be restrained certainly.

In addition to the above, a gear stage (i.e., a speed change ratio) of the transmission is controlled by engaging or releasing the clutch mechanism.

In addition to the above advantages, according to the invention, a variation in the output torque of the transmission can be restrained in both of a downshifting and an upshifting.

In addition to the above, according to the invention, the predetermined time includes a period from a satisfaction of a judgment of shifting operation of the transmission to a commencement of an inertia phase.

Also, the predetermined time includes a period from a start of the engine to a completion of combustion of the engine.

BEST MODE FOR CARRYING OUT THE INVENTION

Figure 2:
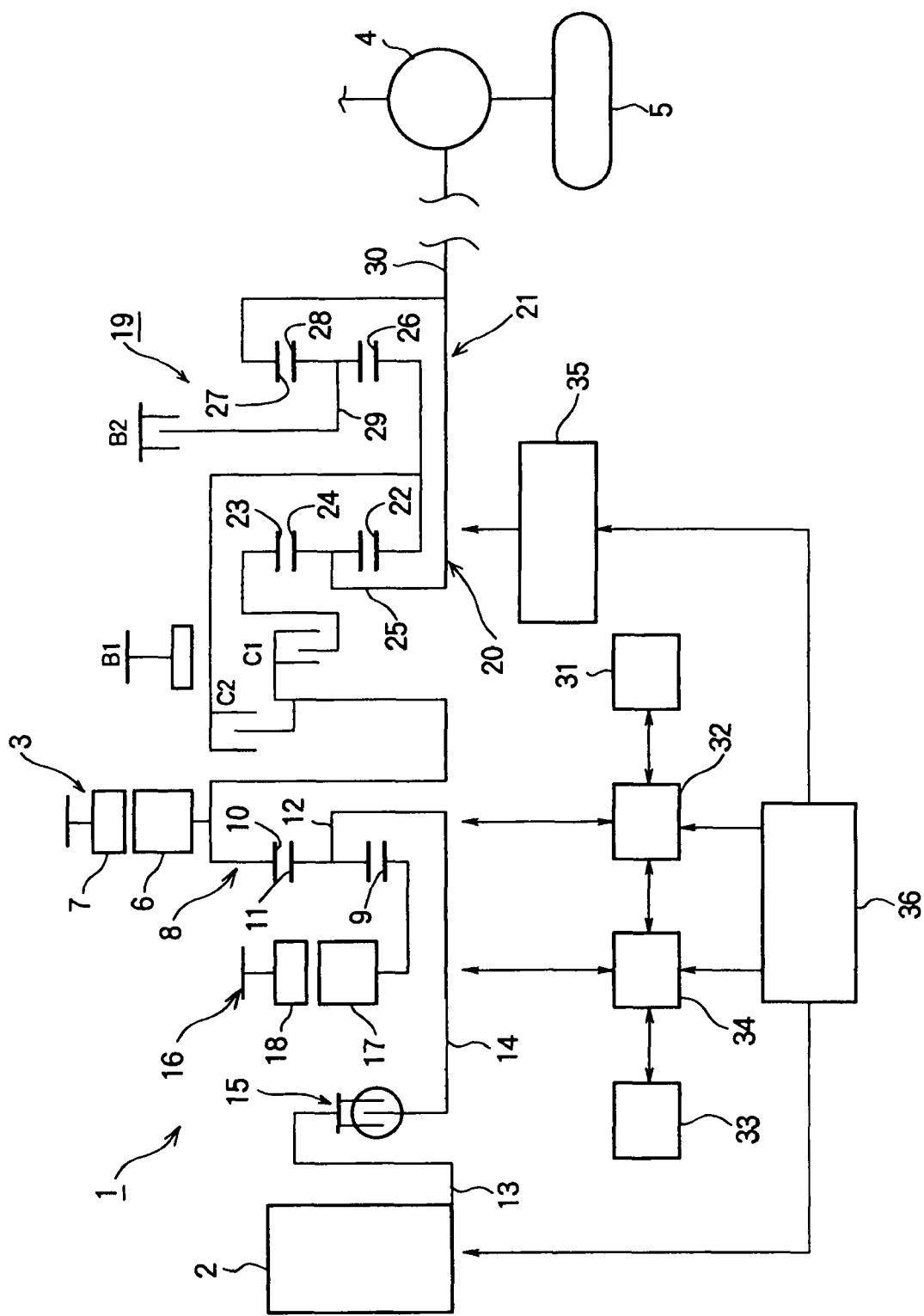
FIG. 2 is a schematic diagram showing a power train of a vehicle and a control line thereof to which the invention is applied.

Next, the present invention will be explained more specifically with reference to the accompanying drawings. FIG. 2 is a skeleton diagram showing one example of a power train of a hybrid vehicle to which the invention is applied. There are provided an engine 2 and a motor generator 3 (MG2) functioning as prime movers of a vehicle 1. The engine 2 and the motor generator 3 (MG2) are connected with a wheel 5 through a differential mechanism 4. The engine 2 is a power unit converting a thermal energy into a kinetic energy by burning a fuel. For example, an internal combustion engine such as a gasoline engine, a diesel engine, an LPG engine and so on can be used as the engine 2. The motor generator 3 comprises a rotor 6 and a stator 7. The motor generator 3 converts electric energy into mechanical energy, and converts mechanical energy into electrical energy. That is, the motor generator 3 functions as a motor (i.e., power generating function) and also functions as a generator (i.e., regenerating function).

A power distribution mechanism 8 is arranged on a route from the engine 2 to the differential mechanism 4. The power distribution mechanism 8 is composed mainly of a single pinion type planetary gear mechanism. Specifically, the power distribution mechanism 8 comprises: a sun gear 9 and a ring gear 10 arranged coaxially; and a carrier 12, which holds a pinion gear 11 meshing with the sun gear 9 and the ring gear 10 in a rotatable and revolvable manner. A crankshaft 13 of the engine 2 and an input shaft 14 are arranged coaxially, and those shafts are connected in a power transmittable manner through a damper mechanism 15. Also, the carrier 12 is connected with the input shaft 14 to rotate integrally therewith. As explained later, the power distribution mechanism 8 is a continuously variable transmission in which a speed change ratio thereof can be controlled electrically.

An another motor generator 16 (MG1) is provided between the engine 2 and the power distribution mechanism 8 in an anteroposterior direction of the vehicle 1. The motor generator 16 also comprises a rotor 17 and a stator 18. The motor generator 16 also converts electric energy into mechanical energy, and converts mechanical energy into electrical energy. That is, the motor generator 16 also functions as a motor (i.e., power generating function) as well as a generator (i.e., regenerating function). The rotor 17 of the motor generator 16 is connected with the sun gear 9 in a power transmittable manner. In other words, the rotor 17 and the sun gear 9 are connected to rotate integrally. Also, the rotor 6 of the motor generator 3 is connected with the ring gear 10 in a power transmittable manner. In other words, the rotor 6 and the ring gear 10 are connected to rotate integrally. Thus, the vehicle 1 comprises two kinds of prime movers having different principles of power generation, such as the engine 2, and the motor generators 3 and 16.

A transmission 19 is arranged on a route from the ring gear 10 of the power distribution mechanism 8 to the differential 4. The transmission 19 is a geared transmission capable of controlling a ratio between an input revolution and an output revolution, i.e., a gear stage thereof stepwise (i.e., discontinuously). The transmission 19 comprises two sets of planetary gear mechanisms, specifically, a first planetary gear transmission mechanism 20 and a second planetary gear transmission mechanism 21. The first planetary gear transmission mechanism 20 is a single pinion type planetary gear mechanism comprising: a sun gear 22 and a ring gear 23 arranged coaxially; and a carrier 25, which holds a pinion gear 24 meshing with the sun gear 22 and the ring gear 23 in a rotatable and revolvable manner. On the other hand, the second planetary gear mechanism 21 is also a single pinion type planetary gear mechanism comprising: a sun gear 26 and a ring gear 27 arranged coaxially; and a carrier 29, which holds a pinion gear 28 meshing with the sun gear 26 and the ring gear 27 in a rotatable and revolvable manner.

The sun gears 22 and 26 are connected to rotate integrally, and the carrier 25 is connected with the ring gear 27 to rotate integrally. The carrier 25 and the ring gear 27 are connected with an output shaft 30 of the transmission 19. The transmission 19 further comprises clutch mechanisms for connecting, disconnecting and fixing the rotary elements such as the gears and the carriers. Here, both types, i.e., hydraulic and electromagnetic clutches may be used, however, a hydraulic clutch is used in this example. Specifically, there are provided a clutch C1 connecting and releasing the ring gears 10 and 23, and a clutch C2 connecting the ring gear 10 with the sun gears 22 and 26, and releasing the ring gear 10 from the sun gears 22 and 26. Also, there are provided a brake B1 for controlling a rotation and a cessation of the sun gears 22 and 26, and a brake B2 for controlling a rotation and a cessation of the carrier 29.

Next, a control line of the vehicle 1 will be explained hereinafter. There are provided an electric storage device 31 exchanging electric power with the motor generator 3, and an inverter 32 for controlling the motor generator 3. Also, there are provided an electric storage device 33 exchanging electric power with the motor generator 16, and an inverter 34 for controlling the motor generator 16. A secondary battery, more specifically, a battery, a capacitor and so on can be used as the electric storage devices 31 and 33. Further, there is provided a hydraulic control unit 35 functioning as an actuator to control the clutches C1 and C2 and the brakes B1 and B2 of the transmission 19. The hydraulic control unit 35 is a known unit comprising a hydraulic circuit, a solenoid valve and so on. Also, there is provided an electronic control unit 36 for controlling the engine 2, the inverters 32 and 34, and the hydraulic control unit 35.

Figure 3:
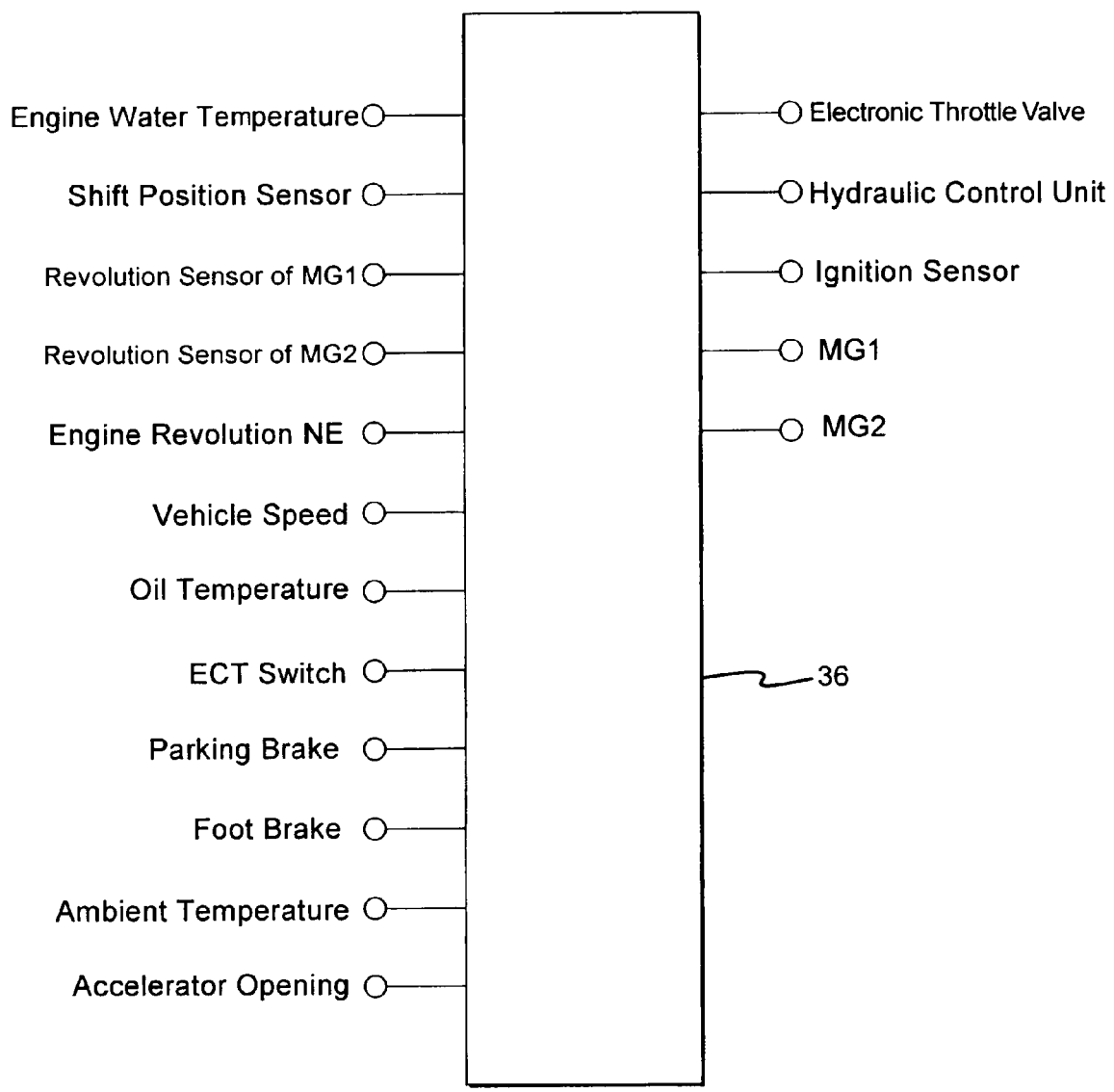
FIG. 3 is a schematic diagram showing signals inputted to an electronic control unit of the vehicle shown in FIG. 2, and signals outputted therefrom.

As shown in FIG. 3, a signal from a shift range sensor, a signal from an engine water temperature sensor, signals from a revolution sensors of the motor generators 3 and 16, a signal from an engine revolution sensor, a signal from a vehicle speed sensor, a signal from an ambient temperature sensor, a signal from an oil temperature sensor, a signal from an ECT switch, a signal from a parking brake switch, a signal from a foot brake switch, a signal from an accelerator opening sensor, signals from an input revolution sensor and an output revolution sensor of the transmission 19 and so on are inputted to the electronic control unit 36. On the other hand, a signal for controlling an electronic throttle valve of the engine 2, a signal for controlling a fuel injection device of the engine 2, a signal for controlling an ignition device of the engine 2, signals for controlling the motor generators 3 and 16 through the inverters 32 and 34, a signal for controlling the hydraulic control unit 35 and so on are outputted from the electronic control unit 36.

Next, here will be explained a control of the vehicle 1. The engine torque is transmitted to the carrier 12 of the power distribution mechanism 8 through the input shaft 14 by driving the engine 2, and the engine torque is outputted from the ring gear 10 of the power distribution mechanism 8 by establishing a reaction force against the engine torque by the motor generator 16. A speed change ratio of the power distribution mechanism 8 can be controlled steplessly (i.e., continuously) by controlling a rotational direction (i.e., forward and backward) of the motor generator 16, and by controlling an operating state thereof between a motor and a generator. Specifically, the carrier 12 functions as an input element, the sun gear 9 functions as a reaction element, and the ring gear 10 functions as an output element. In this situation, the power distribution mechanism 8 functions as a continuously variable transmission as a result of a differential action performed by the carrier 12, the sun gear 9 and the ring gear 10. For example, the speed change ratio of the power distribution mechanism 8 can be controlled by the following method. First of all, a drive demand is obtained on the basis of an opening degree of an accelerator and a vehicle speed, and a target engine output is obtained on the basis of the drive demand. In order to achieve the target engine output, an operating condition of the engine 2 is determined in line with an optimum fuel economy curve, and a target engine revolution and a target engine torque are obtained. Then, the speed change ratio of the power distribution mechanism 8, more specifically, an input revolution is controlled to approximate an actual engine revolution to the target engine revolution. Also, an opening degree of an electronic throttle valve or the like is controlled to approximate the actual engine torque to the target engine torque.

A driving mode can be shifted selectively among: a first driving mode where the motor generator 3 is driven as an electric motor on the basis of a drive demand, and an engine torque is not transmitted to the wheel 5; a second driving mode where both of the engine 2 and the motor generator 3 are driven, and torques thereof are transmitted to the wheel 5; and a third driving mode where the engine 2 is driven, and a torque of the motor generator 3 is not transmitted to the wheel 5. Under the driving mode where the motor generator 3 is driven independently, or under the driving mode where both of the engine 2 and the motor generator 3 are driven, a driving force to be generated by the motor generator 3 is obtained on the basis of a drive demand, and a target output of the motor generator 3, i.e., a target revolution frequency and a target torque are obtained on the basis of the driving force to generate and a gear stage of the transmission 19.

Figures 4, 5:
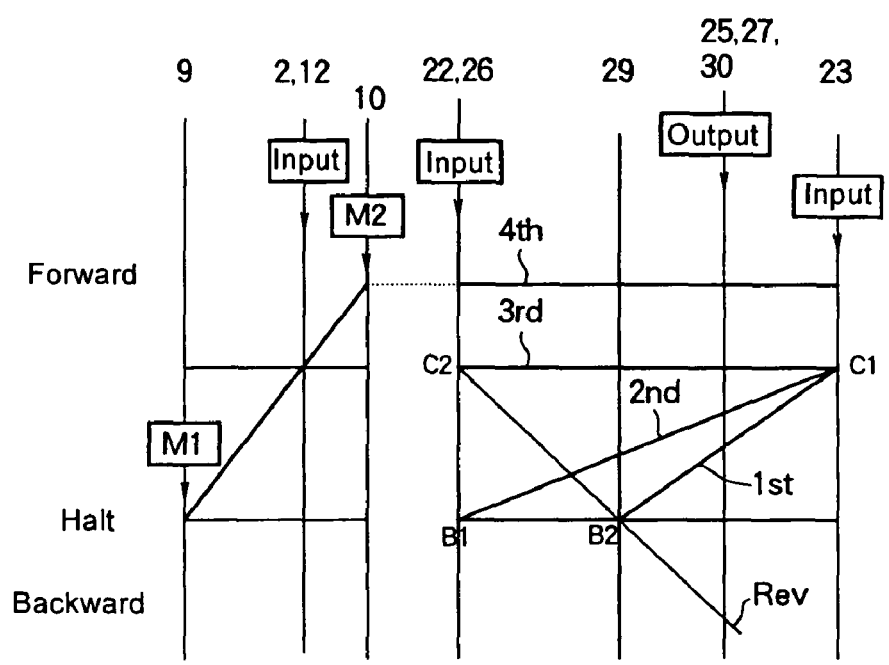
FIG. 4 is a table showing operating states of the clutch mechanisms in each gear stage of D range and R range of the transmission shown in FIG. 2.
FIG. 5 is a nomographic diagram showing shift ranges set by the power distribution mechanism and the transmission shown in FIG. 2.

A shift range for controlling the transmission 19 can be selected from e.g., P (i.e., parking) range, R (i.e., reverse) range, N (i.e., neutral) range and D (i.e., drive) range. For example, in case D range is selected in the transmission 19 shown in FIG. 2, the gear stage of the transmission 19 can be shifted selectively within a first (1st) stage, a second (2nd) stage, a third (3rd) stage and a fourth (4th) stage. In order to shift the gear stage selectively, a speed change map for determining the gear stage according to a vehicle speed and an opening degree of the accelerator is stored in the electronic control unit 36. Control states of the clutch mechanisms under each gear stage of D range, and also N and R ranges are indicated in FIG. 4. In FIG. 4, "○" in a column represents an engagement of the corresponding clutch mechanism, and a blank column represents a state where the corresponding clutch mechanism is released.

Specifically, in case of setting the first stage, the clutch C1 and the brake B2 are engaged, and the clutch C2 and the brake B1 are released. In case of setting the second stage, the clutch C1 and the brake B1 are engaged, and the clutch C2 and the brake B2 are released. In case of setting the third or fourth stage, both of the clutches C1 and C2 are engaged, and both of the brakes B1 and B2 are released. Here, in case of setting the third or fourth stage, the control contents for the transmission 19 are identical in both cases, however, different controls are carried out for the power distribution mechanism 8 in each case. Details of such differences will be explained later. In case of setting R range, the clutch C2 and the brake B2 are engaged, and the clutch C1 and the brake B1 are released. In case that N or P range is selected, all of the clutch mechanisms are released.

Next, statuses of the rotary elements of the transmission 19 under D range will be explained with reference to FIG. 5. In the part of FIG. 5 representing the power distribution mechanism 8, an ordinate axis of the carrier 12 (i.e., an engine 2) is situated between axes of the motor generators 3 and 16. In FIG. 5, "Forward" means a forward rotation, and "Backward" means a backward direction. Here, the "forward direction" means a rotational direction of the engine 2. In case the first stage is selected, the clutch C1 is engaged, and at least one of the torques of the engine 2 and the motor generator 3 is inputted to the ring gear 28 of the transmission 19. In this case, the carrier 29 halted by engaging the brake B2 functions as a reaction element, and the torques outputted from the carrier 25 and the ring gear 27 are transmitted to the output shaft 30. Consequently, the wheel 5 is driven by the torque of the output shaft 30 transmitted to through the differential 4. In case the first stage is thus selected, revolution frequencies of the ring gear 27 and the carrier 25 are lower than that of the ring gear 23. That is, a speed change ratio of the transmission 19 is larger than "1".

In case the second stage is selected, the clutch C1 and the brake B1 are engaged. Therefore, at least one of the torques of the engine 2 and the motor 25 generator 3 is inputted to the ring gear 28 of the transmission 19. In this case, the halted sun gear 22 functions as a reaction element, and the torque outputted from the carrier 25 is transmitted to the output shaft 30. In case the second stage is thus selected, a revolution frequency of the carrier 25 is lower than that of the ring gear 23. That is, a speed change ratio of the transmission 19 is larger than "1". Here, provided that the input revolution is constant, the revolution frequency of the carrier 25 under the first gear stage is lower than that under the second stage. This means that the speed change ratio of the case in which the first stage is set is larger than that of the case in which the second stage is set.

In case the third or fourth stage is selected, both of the clutches C1 and C2 are engaged, therefore, all of the rotary members constituting the first and the second planetary gear transmission mechanisms 20 and 21 are rotated integrally. That is, in case the third or fourth stage is set, the speed change ratio of the transmission 19 is "1". In other wards, the input rotary element and the output rotary element of the transmission 19 are connected directly. Here, a difference between the third stage and the fourth stage is that the motor generator 16 of the power distribution mechanism 8 will not be halted in case of setting the third stage, but it will be halted, i.e., the revolution frequency thereof is zero in case of setting the fourth stage. In case R range is selected, the clutch C2 is engaged, therefore, the sun gear 26 functions as an input element and the carrier 29 functions as a reaction element. Consequently, the ring gear 27 is rotated backwardly. Here, the nomographic diagram of FIG. 5 shows a case in which the revolution frequency of the engine 2 is constant.

Here will be explained a control method to shift the gear stage of the transmission 19 with reference to a flowchart in FIG. 1. Specifically, here will be explained an example of a revolution control of the motor generator 16 establishing a reaction force against the engine torque when carrying out a downshifting to increase the speed change ratio of the transmission 19. First of all, it is judged whether or not a downshifting is being carried out while an accelerator of the vehicle 1 is on, that is, while a torque is being transmitted to the wheel 5 to generate a driving force (at Step S1). Here, the "downshift" includes both of a downshifting from the third stage to the second stage, and a downshifting from the second stage to the first stage. However, the downshifting to be judged at Step S1 is a downshifting in which an engagement and releasing of the clutch mechanisms are involved. That is, none of an engaging operation and a releasing operation of the clutch mechanism is carried out in case a downshifting from the fourth to third stage of the transmission 19 shown in FIG. 19. Therefore, the downshifting from the fourth to third stage is not categorized into the "downshifting" to be judged at Step S1. In case the answer of Step S1 is YES, it is judged whether or not a starting operation of the engine 2 is completed (at Step S2). Here, the definition of the "completion of the starting operation of the engine 2" is that the engine 2 is combusted by feeding a fuel thereto, and a revolution of the engine 2 is raised by the thermal energy to a revolution where the engine 2 can rotate autonomously. That is, in case the engine 2 is combusted completely, the answer of Step S2 is YES. Alternatively, the complete combustion of the engine can also be judged by detecting a lapse of a predetermined time from a starting period of the engine 2 using a timer. Then, in case the answer of Step S2 is NO, it is judged whether or not a flag F1 is zero (at Step S3). A definition of the flag F1 will be explained later.

In case the answer of Step S3 is YES, a current actual revolution frequency nmg1 of the motor generator 16 is assigned as a target revolution tmg1dwn of the motor generator 16, and the flag F1 is set to 1 (at Step S4). That is, the aforementioned "flag F1" is a flag indicating whether or not the current actual revolution frequency nmg1 of the motor generator 16 has already been assigned as the target revolution tmg1dwn. Specifically, in case the "flag F1=zero", this means that the current actual revolution frequency nmg1 has not yet been assigned. On the other hand, in case the "flag F1=1", this means that the current actual revolution frequency nmg1 has already been assigned. Subsequent to Step S4, a control to approximate the actual revolution frequency of the motor generator 16 to the target revolution is carried out (at Step S5), and the control routine is ended.

To the contrary, in case the answer of Step S2 is NO, it is judged whether or not an inertia phase commences during the downshifting of the transmission 19 (at Step S6). For example, a commencement of the inertia phase can be judged using a timer to detect that a predetermined time (or period) has elapsed since a period when a shifting condition is satisfied so that a starting signal of a shifting operation is outputted from the electronic control unit 36. The predetermined time set by the timer is stored in the electronic control unit 36 in advance. Alternatively, a commencement of the inertia phase can also be judged by detecting a rise in the revolution frequency of the motor generator 3 rotating at the same speed with the input side of the transmission 19. In case the answer of Step S6 is NO, the routine advances to Step S5. To the contrary, in case the answer of Step S6 is YES, the target revolution tmg1dwn of the motor generator 16 is calculated on the basis of a target engine revolution, and a variation in the revolution frequency of the motor generator 3 resulting from a shifting operation of the transmission 19, i.e., an engaging and releasing operation of the engagement devices (at Step S7). Then, the routine advances to Step S5. The target engine revolution used at step S7 is obtained on the basis of a vehicle speed and an opening degree of the accelerator to approximate the engine output to an optimum fuel economy curve. In case the answer of Step S1 or S2 is NO, the flag F1 is set to zero (at Step S8). Then, the routine advances to Step S7.

Figure 6:
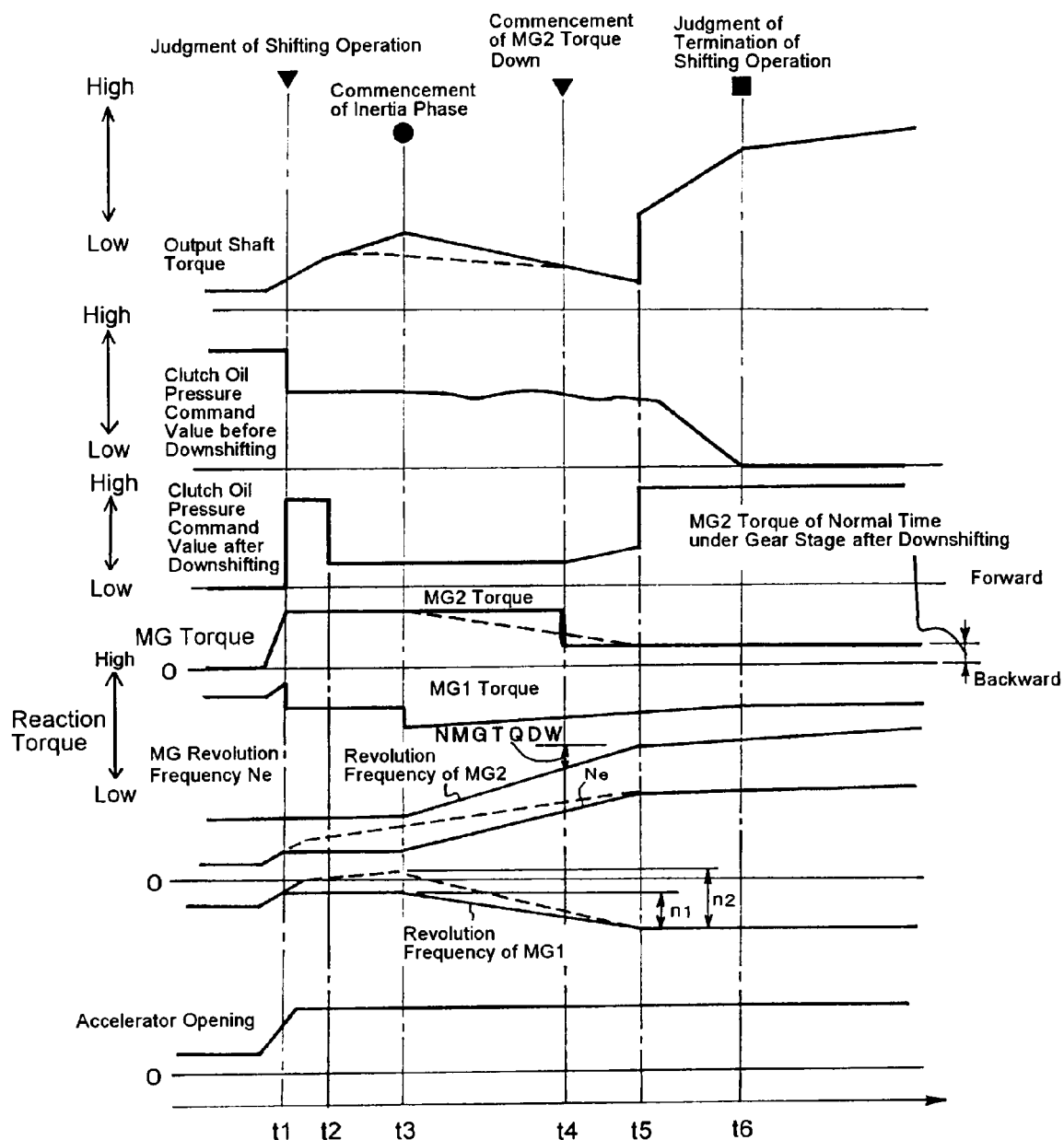
FIG. 6 is a time chart corresponding to the control method shown in FIG. 1.

Here will be explained one example of a time chart corresponding to the flowchart in FIG. 1 with reference to FIG. 6. The time chart of FIG. 6 shows a case in which the control method of FIG. 1 is carried out when a downshifting is carried out while driving the engine 2 under the second driving mode. Both rotational directions and a level of torque of the motor generator 3 are indicated in FIG. 6. On the other hand, a level of the reaction torque of the motor generator 16 is indicated in FIG. 6, but rotational directions thereof are not indicated. Before the time t1, the opening degree of the accelerator is kept generally constant. Also, revolution frequencies of the engine 2 and the motor generator 3 are kept generally constant, and rotational directions thereof are forward. On the other hand, the motor generator 16 is rotated backwardly to function as a motor, and a reaction torque thereof is kept generally constant. In this situation, the engine torque is transmitted to the transmission 19 via the power distribution mechanism 8, and an output shaft torque of the transmission 19 is kept generally constant. Here, the torque of the motor generator 3 is kept to zero (Nm). That is, the motor generator 3 is running idle. An oil pressure for engaging the clutch mechanism engaged under the gear stage before the downshifting is set to high pressure, and an oil pressure for engaging the clutch mechanism to be engaged after the downshifting is set to low pressure.

When the opening degree of the accelerator is increased, the motor generator 3 is controlled to function as a motor, the revolution frequency of engine 2 rises, and the revolution frequency of the motor generator 16 approaches to zero. When a judgment of downshifting is satisfied at the time t1, a command for lowering the oil pressure applied to the engaging clutch mechanism, and a command for raising the oil pressure applied to the released clutch mechanism are outputted. After the time t1, the revolution frequency of the motor generator 16 is kept to the revolution at the time of downshift judgment, as indicated by a solid line. Thus, as indicated by the solid lines, the revolution frequencies of the engine 2 and the motor generator 3 are kept generally constant since the time t1. The torque of the motor generator 3 functioning as a motor is also kept generally constant since the time t1. Thus, the output shaft torque is raised from the period when the opening degree of the accelerator stats increasing even after the time t1. The oil pressure applied to the clutch mechanism to be engaged is temporarily lowered after a lapse of the predetermined time, i.e., at the time t2, and then kept to the lowered pressure.

As the engaging and releasing operations of the clutch mechanism progresses, the reaction torque of the motor generator 16 is lowered, and the torque capacity of the clutch mechanism is increased. Eventually, the downshifting of the transmission 19 reaches an inertia phase at the time t3. That is, the revolution frequencies of the engine 2 and the motor generator 3 start rising. Then, at the time t5, the oil pressure of the clutch mechanism to be released is further lowered, the oil pressure of the clutch mechanism to be engaged is further raised, and the output shaft torque of the transmission 19 rises drastically. Then, a termination of the shifting operation is judged at the time t6, specifically, at the period when the oil pressure of the clutch mechanism engaged under the gear stage before the shifting operation is lowered to the lowest pressure, and the revolution frequency of the motor generator 3 is synchronized with the speed change ratio of the transmission 19 to be set after the shifting operation and with the vehicle speed. The controls carried out between the times t1 and t3 in the time chart of FIG. 6 correspond to the processes from Steps S3 to Step S5 through Step S6 in FIG. 1. Also, the controls of the motor generator 16 carried out after the time t3 in the time chart of FIG. 6 correspond to the control of the case in which the routine advances from Steps S6 to Step S7 in FIG. 1.

Figure 1:
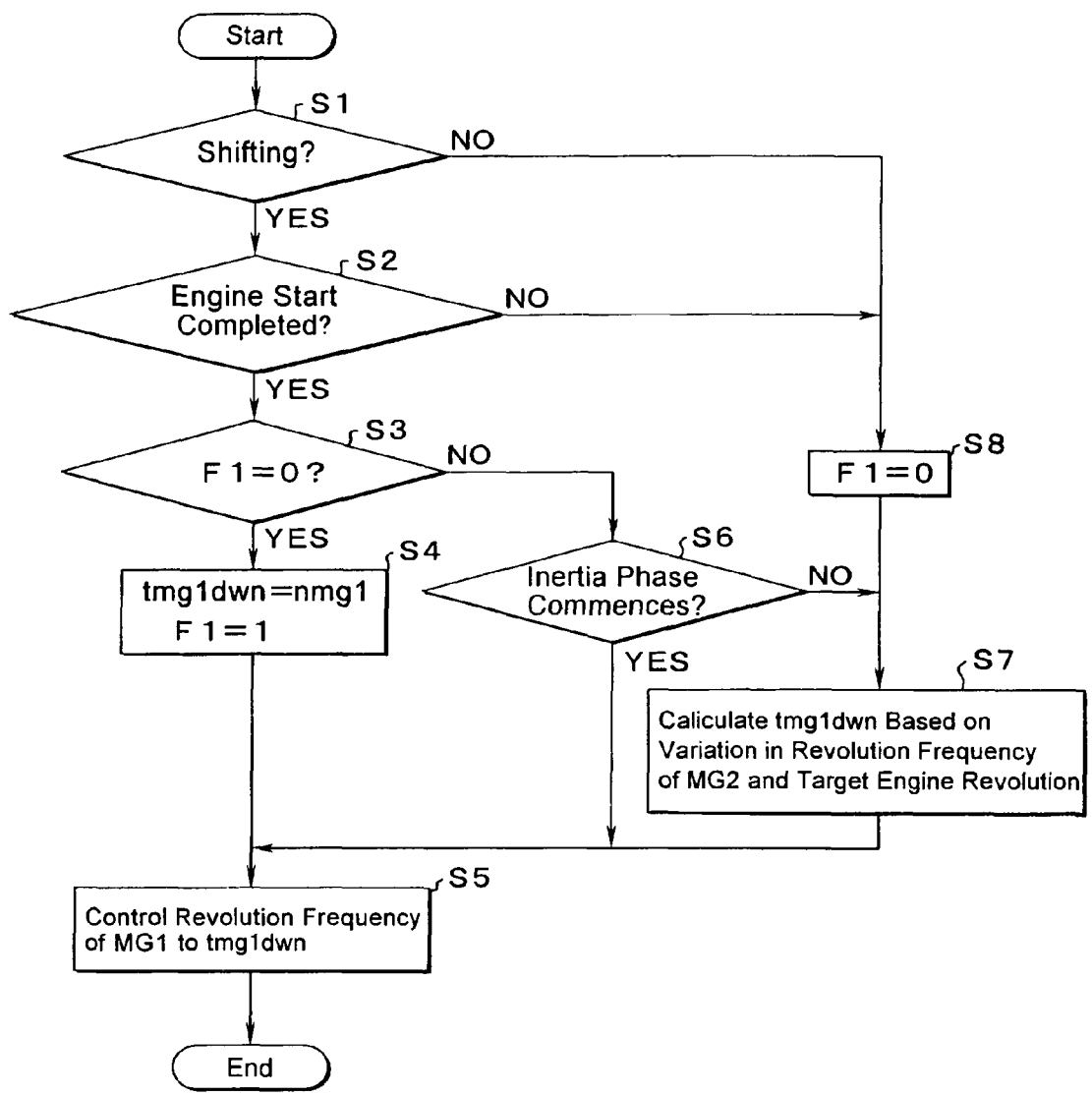
FIG. 1 is a flowchart showing the control method carried out by the control system for drive unit of vehicle of the invention.

Thus, according to the control method in FIG. 1, in case a downshifting of the transmission 19 is carried out, the revolution frequency of the motor generator 16 is kept generally constant until a commencement of the inertia phase in the transmission 19, so as to suppress a rise in the engine revolution. For this reason, the engine power can be prevented from being consumed partially by the inertia resulting from a rise in the revolution. Also, a variation, i.e., a drop in the output shaft torque of the transmission 19 can be prevented. As a result, shocks resulting from a shifting operation can be avoided. Next, here will be explained a comparison example in which the process of Step S7 is carried out prior to the commencement of the inertia phase. In the comparison example, the engine revolution rises with the rise in the revolution frequency of the motor generator 3 as indicated by a broken line, and the revolution frequency of the motor generator 16 establishing a reaction torque varies as indicated by a broken line. Therefore, the power of the engine 2 has to be partially consumed by the inertia resulting from the rise in the revolution frequency. Consequently, the output shaft torque of the transmission 19 is lowered as indicated by a broken line. Here, a difference n1 between the revolution frequencies of the motor generator 16 at the commencing time of the inertia phase indicated by the solid line and at the time t5 is smaller than a difference n2 between the revolution frequencies of the motor generator 16 at the commencing time of the inertia phase indicated by the broken line and at the time t5. This means that the variation in the revolution frequency of the motor generator 16 can be restrained in the amount of a difference between the differences n1 and n2.

Thus, according to the control system of the invention, the revolution control of the motor generator 16 functioning as a reaction force establishing device is carried out in a different manner depending on the execution of the shifting operation of the transmission 19. Alternatively, the control system of the invention restrains a variation in the revolution frequency of the motor generator 16 resulting from a revolution control in case a shifting operation of the transmission 19 is carried out, smaller than the variation of a case in which the shifting operation of the transmission is not carried out. Such revolution control can be carried out by the aforementioned electronic control unit 36. That is, the electronic control unit 36 corresponds to the revolution frequency control means.

Figure 7:
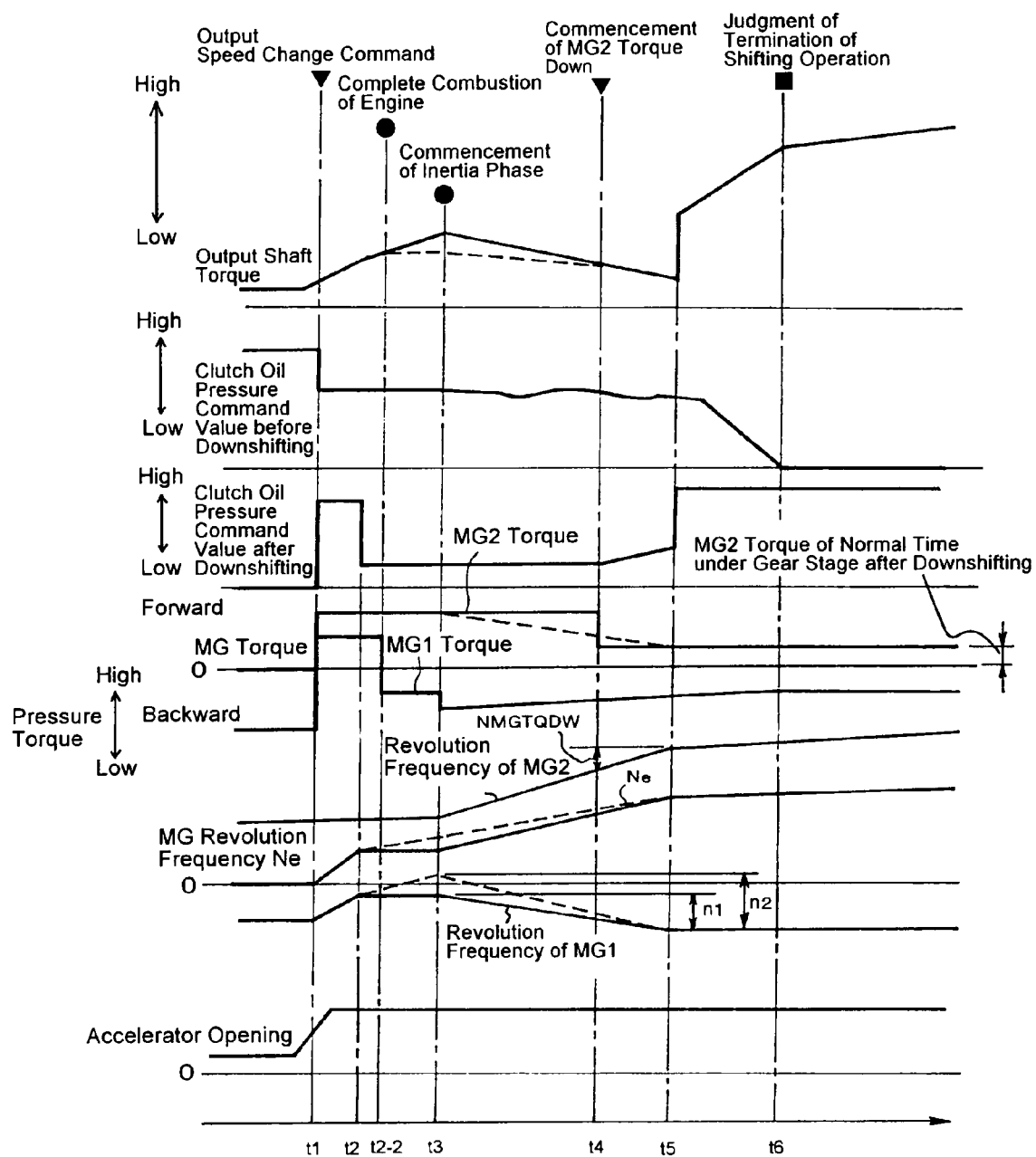
FIG. 7 is another time chart corresponding to the control method shown in FIG. 1.

Next, here will be explained a case of carrying out a downshifting of the transmission 19, while an opening degree of the accelerator is increased so that a demand for starting the engine 2 is outputted, under the first driving mode where the torque of the motor generator 3 is being transmitted to drive the wheel 5. In this case, a completion of the starting operation of the engine 2 is judged at Step S2 after the starting demand of the engine 2 is outputted, and then, the routine advances to Steps S3, S6 and S7 in sequence. One example of a time chart corresponding to the above-mentioned routine is shown in FIG. 7. Both rotational directions and a level of torque of the motor generator 3 are indicated in FIG. 7. On the other hand, a level of the reaction torque of the motor generator 16 is indicated in FIG. 6, but rotational directions thereof are not indicated. Before the time t1, the opening degree of the accelerator is kept generally constant, and the vehicle 1 is run by a driving force of the motor generator 3. In this situation, the engine 2 is halted.

When the opening degree is increased so that the starting condition of the engine 2 is satisfied at the time t1, the motor generator 16 is rotated in the forward direction and a cranking of the engine 2 is carried out by a torque of the motor generator 16. Then, when the engine 2 is combusted completely at the time t2-2 as indicated by the solid line, the torque of the motor generator 16 is lowered, and the revolution frequency of the motor generator 16 is kept constant after the time t2-2. Therefore, the engine revolution will not be raised and kept generally constant as indicated by the solid line even if the downshifting of the transmission 19 is progressed. Then, the reaction torque of the motor generator 16 is further lowered when the inertia phase commences at the time t3, and the engine revolution starts rising as indicated by the solid line. Here, an explanation about the statuses of the parameters in the time chart of FIG. 7 identical to those in the time chart of FIG. 6 is omitted. Thus, a rise in the engine revolution can be suppressed and a drop in the output torque of the transmission 19 can also be restrained, even in case the starting condition of the engine 2 is satisfied and a downshifting of the transmission 19 is carried out under the first driving mode so that the motor generator 3 is driven but the engine 2 is halted.

On the other hand, in case the routine advances to Step S7 before the commencement of inertia phase under the first driving mode, the revolution frequency of the motor generator 16 is obtained from the engine revolution corresponding to the revolution frequency of the motor generator 3 and the optimum fuel economy curve, even if the engine 2 is combusted completely before the commencement of the inertia phase. In this case, the revolution frequency of the motor generator 16 rises as indicated by the solid line. Therefore, the power of the engine 2 is partially consumed by the inertia resulting from a rise in the engine revolution. As a result, the output shaft torque drops lower than the solid line.

In the time chart of FIG. 7, a difference n1 between the revolution frequencies of the motor generator 16 at the commencing time of the inertia phase indicated by the solid line and at the time t5 is smaller than a difference n2 between the revolution frequencies of the motor generator 16 at the commencing time of the inertia phase indicated by the broken line and at the time t5. This means that the variation in the revolution frequency of the motor generator 16 can be restrained in the amount of a difference between the differences n1 and n2.

Here will be explained a corresponding relation between the example illustrated in FIG. 2 and the invention. The engine 2 corresponds to the prime mover of the invention; the wheel 5 corresponds to the wheel of the invention; the power distribution mechanism 8 corresponds to the power distribution mechanism and the electrical continuously variable transmission of the invention; the transmission 19 corresponds to the transmission of the invention; the carrier 12 corresponds to the input element of the invention; the sun gear 9 corresponds to the reaction element of the invention; the ring gear 10 corresponds to the output element of the invention; the motor generator 16 corresponds to the reaction force establishing device of the invention; the motor generator 3 corresponds to the second prime mover and the electric motor of the invention; the clutches C1 and C2, and the brakes B1 and B2 correspond to the clutch mechanisms and the engagement devices of the invention; the clutch C1 corresponds to the first clutch of the invention; the clutch C2 corresponds to the second clutch of the invention; the brake B1 corresponds to the first brake of the invention; and the brake B2 corresponds to the second brake of the invention. Also, the electronic control unit 36 for carrying out the controls of Steps S1, S2, S3, S4, S5 and S6 in FIG. 2 corresponds to the revolution frequency control means of the invention.

Figure 8:
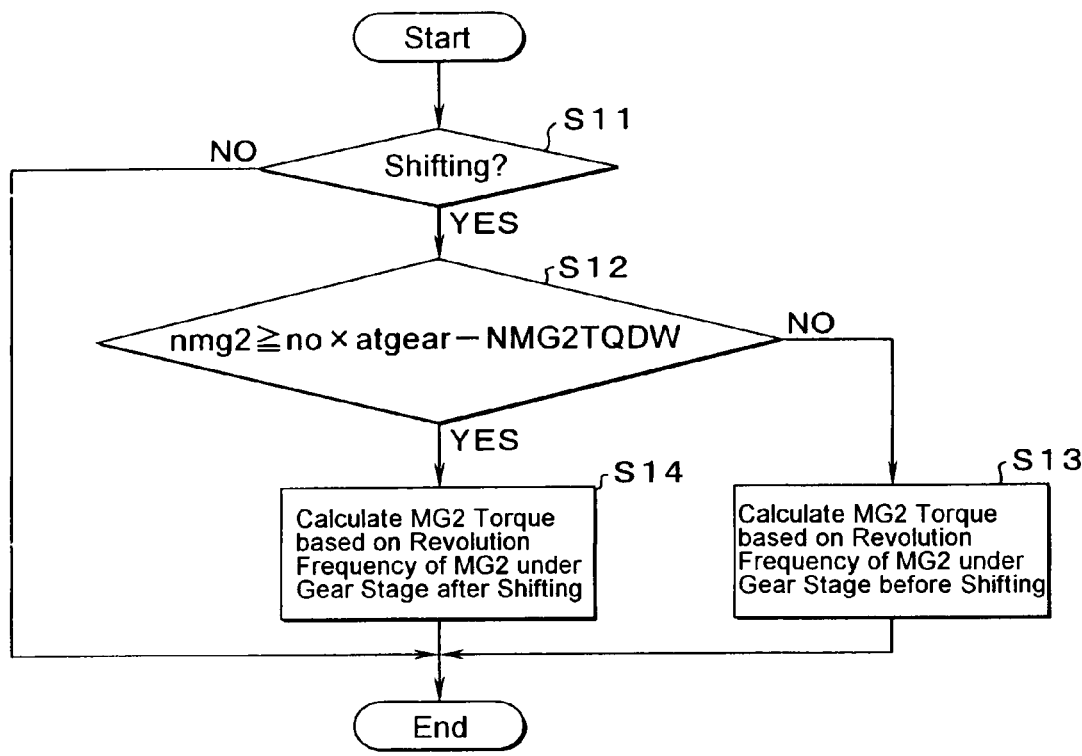
FIG. 8 a flowchart showing a control method in which a part of steps in the control method shown in FIG. 1 is embodied.

Here will be explained another control method shown in FIG. 8 to be carried out in the vehicle 1 shown in FIG. 2 during a downshifting of the transmission 19. FIG. 8 shows an example for controlling a torque of the motor generator 3 after a commencement of the inertia phase. Here, the example shown in FIG. 8 is carried out in combination with the control method shown in FIG. 1. First of all, it is judged whether or not a downshifting is being carried out and an inertia phase commences (at Step S11). The judgment of Step S11 is identical to judgments of Steps S1 and S6. In case the answer of Step S11 is NO, the control routine is ended. To the contrary, in case the answer of Step S11 is YES, it is judged whether or not the following formula:

$$nmg2 \geq no \times atgear - NMG2TQDW$$

is satisfied (at Step S12).

In the above formula, "nmg2" represents a "revolution frequency of the motor generator 3", "no" represents an "output revolution of the transmission 19", "atgear" represents a "speed change ratio of the gear stage of the transmission 19 after downshifting", and "NMG2TQDW" represents a "predetermined revolution frequency". More specifically, the predetermined revolution NMG2TQDW is a difference between: an actual revolution frequency of the motor generator 3 at the period when a torque control signal for approximating an actual torque of the motor generator 3 to a target torque is outputted for the occasion of confirming the revolution frequency of the motor generator 3 to the vehicle speed and the gear stage to be achieved after the shifting operation; and an actual revolution frequency of the motor generator 3 at the period when the torque of the motor generator 3 reaches the target torque after a response delay. In case the answer of Step S12 is NO, a torque of the motor generator 3 is calculated on the basis of the revolution frequency of the motor generator 3 under the gear stage before the downshifting (at Step S13), and then the control routine is ended. To the contrary, in case the answer of Step S12 is YES, a torque of the motor generator 3 is calculated on the basis of the revolution frequency of the motor generator 3 under the gear stage to be achieved after the downshifting (at Step S14), and then the control routine is ended. Here, the revolution frequencies and the torques of the motor generator 3 at Steps S13 and S14 are obtained in the same way as the aforementioned case of calculating the target output of the motor generator 3.

Here will be explained one example of a time chart corresponding to the control method of FIG. 8 with reference to FIGS. 6 and 7. As explained above, the inertia phase commences at the time t3, and the judgment at Step S12 is made affirmatively at the time t4. Specifically, the torque of the motor generator 3 is kept generally constant as indicated by the solid line after the time t3 by the process of Step S13. The torque of the motor generator 3 is lowered at the time t4 to the torque corresponding to the revolution frequency of the motor generator 3 under the gear stage to be achieved after the downshifting, and then kept generally constant.

Thus, according to control method of FIG. 8, the target revolution and the target torque of the motor generator 3 are calculated on the basis of a drive demand of the vehicle 1 and a speed change ratio of the transmission 19 of before the shifting operation, after the commencement of the inertia phase during a downshifting of the transmission 19. Therefore, a drop in the output torque of the transmission 19 after the commencement of the inertia phase can be restrained so that an occurrence of shift shocks can be avoided. Further, from the time t4, the torque of the motor generator 3 is kept to the torque according to the revolution frequency thereof corresponding to the speed change ratio of the transmission 19 achieved after the downshifting.

Here will be explained a relation between the examples shown in FIGS. 2 and 8 and the present invention. The electronic control unit 36 carrying out the controls from Step S11 to Step S13 via Step S12 in FIG. 8 corresponds to the first electric motor control means of the invention; and the electronic control unit 36 carrying out the controls from Step S11 to Step S14 via Step S12 in FIG. 8 corresponds to the second electric motor control means of the invention.

Figure 9:
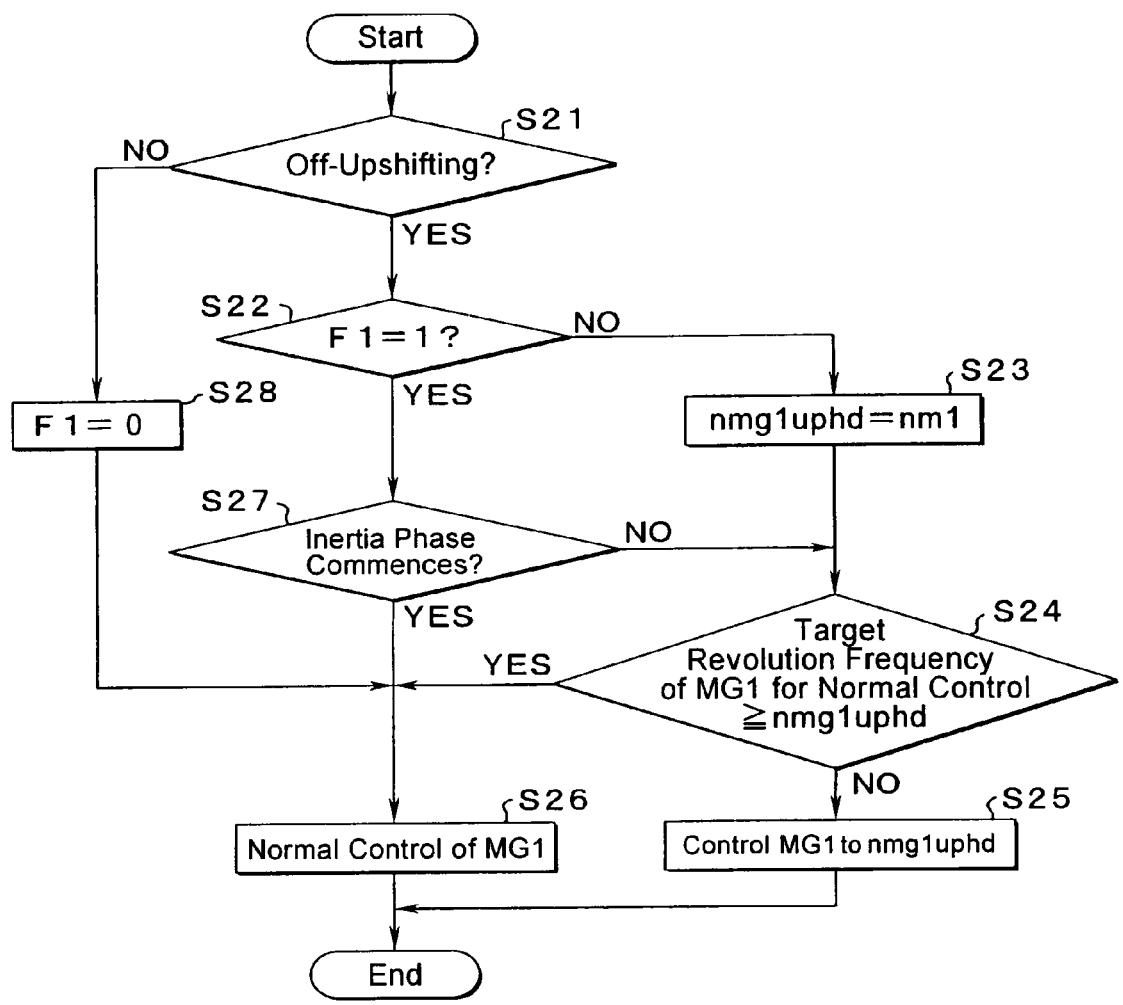
FIG. 9 is a flowchart showing another control method can be carried out in the vehicle shown in FIG. 2.

Here will be explained a control example, i.e., a control method shown in FIG. 9 to be carried out in the vehicle 1 shown in FIG. 2. The flowchart of FIG. 9 shows an example for carrying out an upshifting of the transmission 19. First of all, it is judged whether or not a drive demand for the vehicle 1 is decreasing and an upshifting is being carried out (at Step S21). Specifically, such reduction in the drive demand is judged in case the accelerator pedal is returned. Here, the upshifting to be judged is an upshifting in which a engaging and releasing operation of the clutch mechanisms are involved. In case the answer of Step S 21 is YES, it is judged whether or not the flag F1 is 1 (at Step S22). A definition of the flag F1 will be explained later.

In case the answer of Step S22 is YES, a current actual revolution frequency nm1 of the motor generator 16 is assigned as a target revolution (or a restraining revolution) nmg1uphd of the motor generator 16, and the flag F1 is set to 1 (at Step S23). That is, the aforementioned "flag F1" is a flag indicating whether or not the current actual revolution frequency nm1 of the motor generator 16 has already been assigned as the target revolution nmg1uphd. Specifically, in case it is not the "flag F1=zero", this means that the target revolution nmg1uphd of the motor generator 16 has not yet been obtained or has already been cancelled. On the other hand, in case the "flag F1=1", this means that the target revolution nmg1uphd of the motor generator 16 has already been obtained. Subsequent to Step S23, "the target revolution nmg1uphd of the motor generator 16" is compared to "the target revolution for the normal control" which is obtained to control the motor generator 16 when controlling the speed change ratio of power distribution mechanism 8 according to the drive demand, and it is judged which is more effective to restrain a drop in the engine revolution (at Step S24). In case the target revolution nmg1uphd of the motor generator 16 is much more effective to restrain a drop in the engine revolution, the answer of Step S24 is NO so that the revolution frequency of the motor generator 16 is controlled on the basis of the target revolution nmg1uphd (at Step S25). Then, the control routine is ended.

To the contrary, in case the target revolution for the normal control is much more effective to restrain a drop in the engine revolution at the moment of Step S24, the answer of Step S24 is YES so that the revolution frequency of the motor generator 16 is controlled on the basis of the target revolution for the normal control (at Step S26). Then, the control routine is ended. On the other hand, in case the routine advances to Step S22 after the target revolution nmg1uphd of the motor generator 16 is obtained as explained above, the answer of Step S22 is YES. Then, it is judged whether or not an inertia phase commences during the upshifting of the transmission 19 (at Step S27). In case the answer of Step S27 is NO, the routine advances to Step S24. To the contrary, in case the answer of Step S27 is YES, the routine advances to Step S26. Here, in case the answer of Step S21 is NO, for example, in case the accelerator pedal is stepped on after the commencement of the upshifting but before the commencement of the inertia phase, the flag F1 is set to zero (at Step S28). Then the routine advances to Step S26. That is, a storage of the aforementioned the target revolution nmg1uphd is cancelled.

Figure 10:
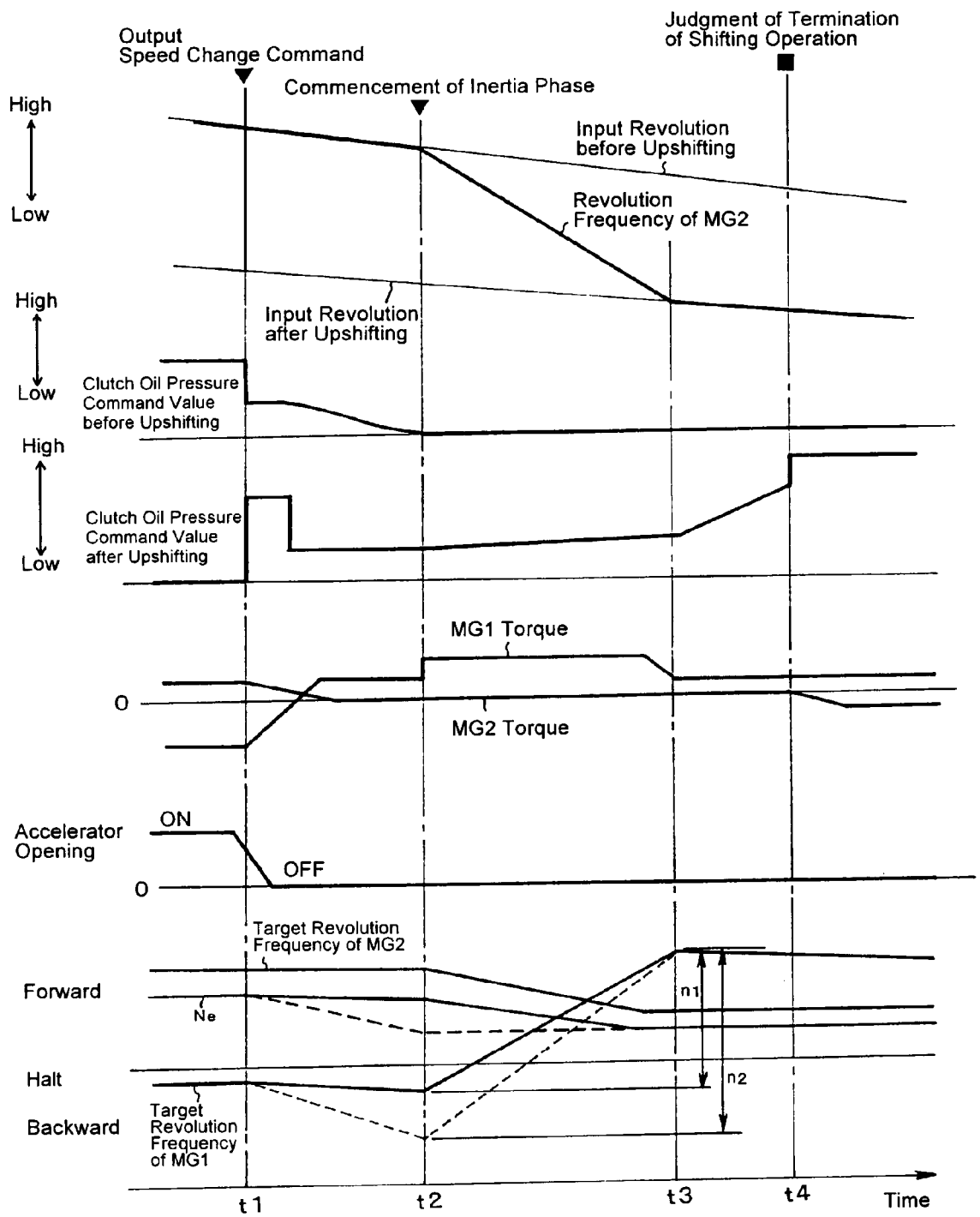
FIG. 10 is a time chart corresponding to the control method shown in FIG. 9.

Here will be explained one example of a time chart corresponding to the flowchart in FIG. 9 with reference to FIG. 10. Before the time t1, the accelerator pedal is stepped on. In this situation, the oil pressure applied to the clutch mechanism engaged under the gear stage being set before the upshifting is high. On the other hand, the oil pressure applied to the clutch mechanism to be engaged under the gear stage to be set after the upshifting is low. Meanwhile, revolution frequencies of the engine 2 and the motor generators 3 and 16 are kept generally constant. When the accelerator pedal is returned so that a judgment of upshifting is satisfied at the time t1, the oil pressure of the clutch mechanism engaged under the gear stage being set before the upshifting is lowered, and the oil pressure of the clutch mechanism to be engaged under the gear stage set after the upshifting is raised. At the time t1, a torque of the motor generator 3 functioning as a motor is lowered, and a reaction torque of the motor generator 16 rotating backwardly and functioning as a motor is also lowered. Therefore, the revolution frequency of the motor generator 16 is suppressed to be raised in the backward direction, i.e., in the direction apart from zero, as indicated by the solid line. As a result, a drop in the revolution frequency of the engine 2 can be restrained as indicated by the solid line.

As a result of the rise in the torque capacity of the clutch mechanism to be engaged, the input revolution of the transmission 19 and the revolution frequency of the motor generator 3 start lowering. That is, an inertia phase commences. As a result, a rotational direction of the motor generator 16 turns into the forward direction via zero revolution, and the engine revolution starts lowering gently. Then, the input revolution of the transmission 19 is synchronized with the revolution frequency corresponding to the vehicle speed and the gear stage to be achieved after the upshifting, and the oil pressure of the clutch mechanism to be engaged is raised to the highest value. As a result, a termination of the upshifting is judged.

Thus, according to the control method of FIG. 9, a drop in the engine revolution can be restrained before a commencement of the inertia phase, in case the drive demand is decreased and an upshifting of the transmission 19 is carried out. Also, after the commencement of the inertia phase, an increase in a variation of revolution frequency of the motor generator 16 can be suppressed. For this reason, shocks resulting from a shifting operation can be prevented. On the other hand, in case a demand for raising the driving force of the vehicle 1 is outputted before the commencement of the inertia phase in the transmission 19, the answer of Step S21 is NO. In this case, the flag F1 is set to zero so that the revolution frequency of the motor generator 16 being held is released, and the revolution frequency of the motor generator 16 is controlled based on the target revolution for the normal control. Therefore, the revolution frequencies of the motor generator 16 and the engine 2 can be controlled according to the drive demand.

In case the target revolution determined on the basis of the drive demand is much more effective than the target revolution determined at Step S23 to restrain a drop in the engine revolution, as the case in which the answer of Step S24 is YES, the target revolution for the normal control is to be selected. Therefore, a drop in the engine revolution can be restrained more certainly. On the other hand, after the time t1, if the revolution frequency of the motor generator 16 is controlled in line with the optimum fuel economy curve as indicated by the broken line, the engine revolution is lowered as a result of an engaging and a releasing operations of the clutch mechanism as indicated by the broken line. A variation in the revolution frequency of the motor generator 16 is thereby widened during the inertia phase, and as a result, shift shocks may occur in the transmission 19. According to the control example of the invention, the revolution frequency of the motor generator 16 is varied during the period of t1 to t3 as represented by n1 in FIG. 9. On the other hand, according to the comparison example, the revolution frequency of the motor generator 16 is varied during the period of t1 to t3 as represented by n2 in FIG. 9. Thus, as can be seen from FIG. 9, the difference n1 is smaller than the difference n2. This means that the variation in the revolution frequency of the motor generator 16 can be restrained in the amount of a difference between the differences n1 and n2. Here will be explained a relation between the examples shown in FIGS. 2 and 9 and the present invention. The electronic control unit 36 carrying out the controls of Steps S21, S22, S23, S24, S25 and S27 in FIG. 9 corresponds to the revolution frequency control means of the invention; the electronic control unit 36 carrying out the controls of Steps S21, S28 and S26 in FIG. 9 corresponds to the first canceling means of the invention; and the electronic control unit 36 carrying out the control advances to Step S24 via Step S27 in FIG. 9 corresponds to the second canceling means of the invention.

In the power train illustrated in FIG. 2, although the single pinion type planetary gear mechanism is used as the power distribution mechanism 8, a double pinion type planetary gear mechanism may also be used as the power distribution mechanism. In this case, rotary elements are connected to arrange the engine between two motor generators in a nomographic diagram. It is also possible to use a power distribution mechanism comprising four rotary elements, in which any of those rotary elements is switched to function as an input element, reaction element and an output element selectively. On the other hand, the transmission arranged on the route from the power distribution mechanism to the wheel may also be a geared transmission capable of setting five or more gear stages under D range. Here, in case the transmission is capable of setting a plurality of ranges for setting different gear stages, for example, the transmission is capable of setting a $4^{th}$ range, $3^{rd}$ range, $2^{nd}$ range and so on, the aforementioned control example can be carried out in case of carrying out an upshifting or downshifting in any of the ranges. As explained above, the geared transmission having the frictional engagement devices as the clutch mechanisms governing a shifting operation is employed in the aforementioned examples, however, it is also possible to use a transmission in which the gear stage is controlled by a synchronizer mechanism. Additionally, the control for the upshift operation is carried out in any of the cases of upshifting from the first to second stage, the second to third stage, and the third to fourth stage. Also the control for the downshift operation is carried out in any of the cases of downshifting from the fourth to third stage, the third to second stage, and the second to first stage. However, a variation in the input revolution, that is, an occurrence of the inertia phase is a precondition to carry out the above explained controls.

In addition to above, the present invention may also be applied to a vehicle having an electric motor or a hydraulic motor as a prime mover instead of the engine 2. Alternatively, the electric motor or the hydraulic motor may also be used as a reaction force establishing device instead of the motor generator 16. Moreover, a flywheel system and a hydraulic motor may be used as a second prime mover instead of the motor generator 3. Further, an electromagnetic type clutch mechanism, a powder type clutch mechanism, a synchromesh type clutch mechanism and so on may also be used instead of the hydraulic type clutch mechanism. Here, the clutch mechanism includes a one-way clutch. Specifically, according to the invention, the transmission includes a transmission in which a gear stage thereof is shifted by engaging and releasing the one-way clutch. Furthermore, according to the invention, the clutch mechanism includes a brake which controls a rotation and cessation of the rotary elements. The control examples shown in the accompanying figures may also be applied to any of a front drive vehicle (or two wheel drive vehicles), in which an engine and two motor generators are connected to front wheels, and a front drive vehicle in which an engine and two motor generators are connected to rear wheels. Further, the control examples shown in the accompanying figures may also be applied to a four wheel drive vehicle, in which an engine and two motor generators are connected to both front and rear wheels.

INDUSTRIAL APPLICABILITY

The present invention can be utilized in a field of manufacturing and repairing automobiles such as cars, and in a field of manufacturing and processing parts for automobiles.

The invention claimed is:

1. A control system for a drive unit of a vehicle, in which: a power distribution mechanism is arranged on a route from a prime mover to a wheel; a transmission is arranged on an output side of the power distribution mechanism; the power distribution mechanism comprises an input element connected with the prime mover, a reaction element connected with a reaction force establishing device and an output element connected with an input side of the transmission; and a speed change ratio of the power distribution mechanism is controlled by controlling an output of the reaction force establishing device establishing a reaction force against the prime mover, comprising:
a revolution frequency control means for restraining a variation in a revolution frequency of the prime mover by controlling a revolution frequency of the reaction force establishing device within a predetermined time from a commencement of a shifting operation of the transmission.

2. A control system for a drive unit of a vehicle, in which: a power distribution mechanism is arranged on a route from a prime mover to a wheel; a transmission is arranged on an output side of the power distribution mechanism; the power distribution mechanism comprises an input element connected with the prime mover, a reaction element connected with a reaction force establishing device and an output element connected with an input side of the transmission; and a speed change ratio of the power distribution mechanism is controlled by controlling an output of the reaction force establishing device establishing a reaction force against the prime mover, wherein:
a control content for controlling a revolution frequency of the reaction force establishing device is changed in case of carrying out a shifting operation of the transmission, from the control content for controlling a revolution frequency of the reaction force establishing device of a case in which a shifting operation of the transmission is not carried out.

3. A control system for a drive unit of a vehicle, in which: a power distribution mechanism is arranged on a route from a prime mover to a wheel; a transmission is arranged on an output side of the power distribution mechanism; the power distribution mechanism comprises an input element connected with the prime mover, a reaction element connected with a reaction force establishing device and an output element connected with an input side of the transmission; and a speed change ratio of the power distribution mechanism is controlled by controlling an output of the reaction force establishing device establishing a reaction force against the prime mover, wherein:
a variation in a revolution frequency of the reaction force establishing device resulting from an execution of a revolution control in case of carrying out a shifting operation of the transmission is restrained smaller than that of a case in which the shifting operation of the transmission is not carried out.

4. The control system for the drive unit of the vehicle as claimed in claim 1, comprising:
a second prime mover inputting a torque to the input side of the transmission.

5. The control system for the drive unit of the vehicle as claimed in claim 4,
wherein the prime mover includes an engine, and
wherein the second prime mover includes an electric motor.

6. The control system for the drive unit of the vehicle as claimed in claim 1,
wherein the revolution frequency control means includes a means for suppressing a rise in the revolution frequency of the prime mover by controlling the revolution frequency of the reaction force establishing device within the predetermined time from the commencement of the shifting operation, in case a demand to raise a driving force of the vehicle is outputted and a shifting operation to increase a speed change ratio of the transmission is carried out.

7. The control system for the drive unit of the vehicle as claimed in claim 5,
wherein a driving mode can be switched selectively between a first driving mode where a torque of the engine is not transmitted to the wheel but a torque of the electric motor is transmitted to the wheel through the transmission, and a second driving mode where the torque of the engine is transmitted to the wheel, and
wherein the revolution frequency control means further includes a means for suppressing a rise in the revolution frequency of the engine by holding the revolution frequency of the reaction force establishing device at a point when the predetermined time has elapsed since a starting period of the engine started by switching the driving mode from the first driving mode to the second driving mode.

8. The control system for the drive unit of the vehicle as claimed in claim 6, further comprising:
a first electric motor control means for determining a target revolution and a target torque of the electric motor after a lapse of the predetermined time from the commencement of the shifting operation of the transmission, on the basis of a drive demand of the vehicle and a speed change ratio of the transmission before the shifting operation.

9. The control system for the drive unit of the vehicle as claimed in claim 8, further comprising:
a second electric motor control means for controlling a torque of the electric motor after the torque of the electric motor is controlled by the first electric motor control means, according to a revolution frequency of the electric motor corresponding to a speed change ratio of the transmission after a shifting operation, before the revolution frequency of the electric motor reaches the revolution frequency corresponding to the speed change ratio of the transmission after the shifting operation.

10. The control system for the drive unit of the vehicle as claimed in claim 1, wherein:
the revolution frequency control means includes a means for restraining a drop in the revolution frequency of the prime mover by controlling the revolution frequency of the reaction force establishing device within the predetermined time from the commencement of the shifting operation, in case a demand for reducing a driving force of the vehicle is being outputted and shifting operation to reduce a speed change ratio of the transmission is carried out.

11. The control system for the drive unit of the vehicle as claimed in claim 10, further comprising:
a first canceling means for canceling the control of restraining the drop in the revolution frequency of the prime mover, and controlling the revolution frequency of the reaction force establishing device to control a speed change ratio of the power distribution mechanism based on a drive demand of the vehicle, in case a demand for increasing the driving force of the vehicle is outputted within the predetermined time from the commencement of the shifting operation of the transmission.

12. The control system for the drive unit of the vehicle as claimed in claim 11, further comprising:
a drive demand judging means for judging a drive demand of the vehicle on the basis of a vehicle speed and an opening degree of an accelerator; and
a second canceling means for determining the revolution frequency of the reaction force establishing device to control the speed change ratio of the power distribution mechanism based on the drive demand, and for canceling a restraining revolution frequency obtained and stored to restrain the drop in the revolution frequency of the prime mover, in case the determined revolution frequency of the reaction force establishing device is much more effective than the restraining revolution frequency to restrain the drop in the revolution frequency of the prime mover.

13. The control system for the drive unit of the vehicle as claimed in claim 1,
wherein the transmission includes a transmission in which a gear stage thereof is shifted by engaging or releasing the clutch mechanism.

14. The control system for the drive unit of the vehicle as claimed in claim 1,
wherein a shifting operation of the transmission includes both a downshifting to increase a speed change ratio thereof and an upshifting to reduce a speed change ratio thereof.

15. The control system for the drive unit of the vehicle as claimed in claim 1,
wherein the predetermined time includes a period from a satisfaction of a judgment of shifting operation of the transmission to a commencement of an inertia phase.

16. The control system for the drive unit of the vehicle as claimed in claim 7,
wherein the predetermined time includes a period from a start of the engine to a completion of a combustion of the engine.

17. The control system for the drive unit of the vehicle as claimed in claim 1,
wherein the power distribution mechanism includes an electrical continuously variable transmission in which the speed change ratio thereof is controlled electrically and varied continuously, and
wherein the transmission includes a geared transmission in which a gear stage thereof is changed stepwise.

18. The control system for the drive unit of the vehicle as claimed claim 17,
wherein the electrical continuously variable transmission and the geared transmission may be connected in tandem so as to input power outputted from any one of those transmissions to the other one.

19. The control system for the drive unit of the vehicle as claimed in claim 17,
wherein the speed change ratio of the drive unit is set by both of the electrical continuously variable transmission and geared transmission.

20. The control system for the drive unit of the vehicle as claimed in claim 19,
wherein the electrical continuously variable transmission includes a single pinion planetary gear mechanism including a carrier functioning as the input element, a sun gear functioning as the reaction element, and a ring gear functioning as the output element.

21. The control system for the drive unit of the vehicle as claimed in claim 1,
wherein the transmission is constructed of two sets of planetary gear mechanisms and a plurality of engagement devices.

22. The control system for the drive unit of the vehicle as claimed in claim 21,
wherein the two sets of planetary gear mechanisms include a single pinion planetary gear mechanism,
wherein the sun gears of the first and the second planetary gear mechanisms are connected with each other, and the carrier of the first planetary gear mechanism and the ring gear of the second planetary gear mechanism are connected with each other, and
wherein the engagement device includes
a first clutch connecting the ring gear of the first planetary gear mechanism and the output element of the power distribution mechanism selectively;
a second clutch connecting the sun gear of the first planetary gear mechanism and the sun gear of the second planetary gear mechanism with the output element of the power distribution mechanism selectively;
the second clutch fixing the sun gears of the first and the second planetary gear mechanisms selectively; and
a second brake fixing the carrier of the second planetary gear mechanisms selectively.

23. A control method for a drive unit of a vehicle, in which: a power distribution mechanism is arranged on a route from a prime mover to a wheel; a transmission is arranged on an output side of the power distribution mechanism; the power distribution mechanism comprises an input element connected with the prime mover, a reaction element connected with a reaction force establishing device and an output element connected with an input side of the transmission; and a speed change ratio of the power distribution mechanism is controlled by controlling an output of the reaction force establishing device establishing a reaction force against the prime mover, comprising:
a revolution frequency control restraining a variation in a revolution frequency of the prime mover by controlling a revolution frequency of the reaction force establishing device within a predetermined time from a commencement of a shifting operation of the transmission.

24. A control system for a drive unit of a vehicle, in which: a power distribution mechanism is arranged on a route from a prime mover to a wheel; a transmission is arranged on an output side of the power distribution mechanism; the power distribution mechanism comprises an input element connected with the prime mover, a reaction element connected with a reaction force establishing device and an output element connected with an input side of the transmission; and a speed change ratio of the power distribution mechanism is controlled by controlling an output of the reaction force establishing device establishing a reaction force against the prime mover, comprising:
a revolution frequency control device for restraining a variation in a revolution frequency of the prime mover by controlling a revolution frequency of the reaction force establishing device within a predetermined time from a commencement of a shifting operation of the transmission.

* * * * *